C. A. JOHNSON.
THREADING TOOL.
APPLICATION FILED OCT. 7, 1916.
1,250,185.
Patented Dec. 18, 1917.
2 SHEETS—SHEET 2.
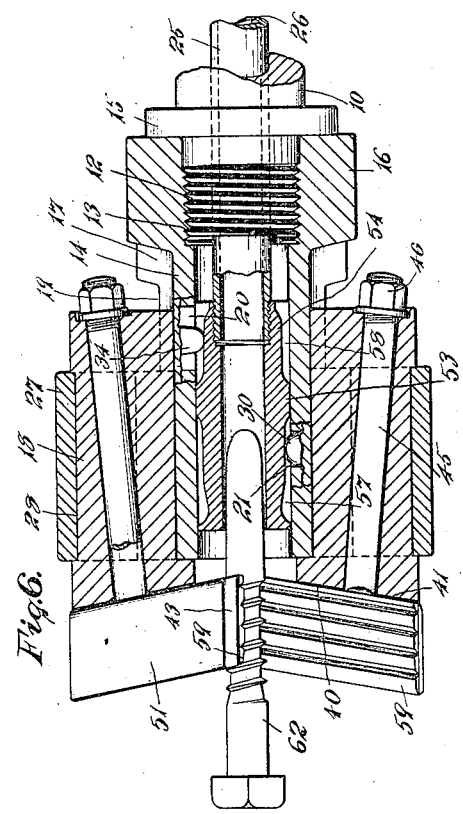
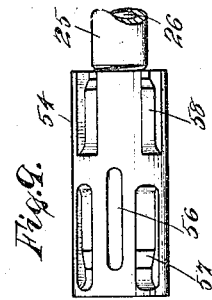
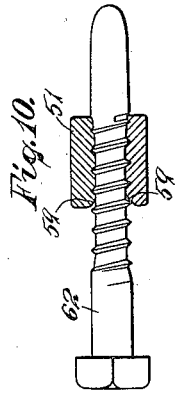
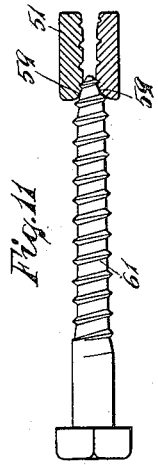
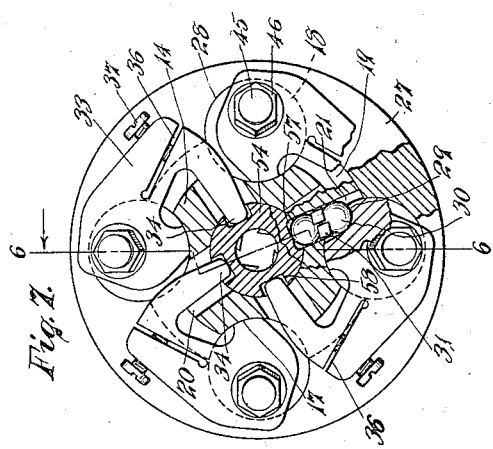
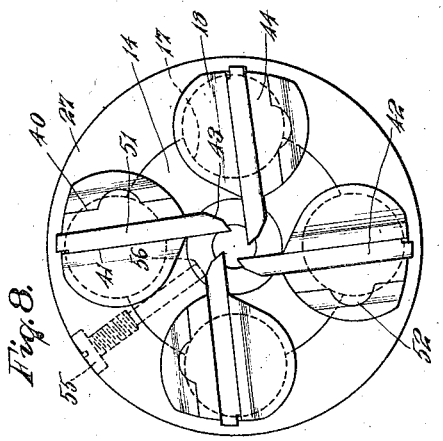
INVENTOR.
Charles A. Johnson.
BY Arthur B. Jenkins,
ATTORNEY.

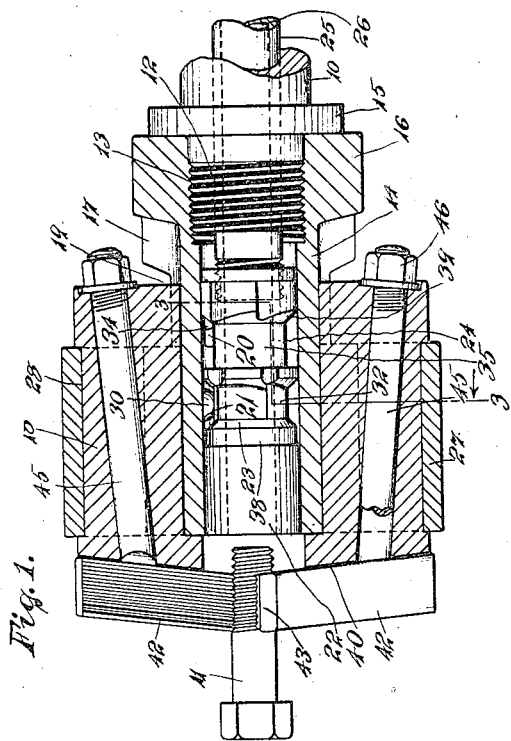

UNITED STATES PATENT OFFICE.

CHARLES A. JOHNSON, OF UNIONVILLE, CONNECTICUT.

THREADING-TOOL.

1,250,185.  Specification of Letters Patent.  Patented Dec. 18, 1917.

Application filed October 7, 1916. Serial No. 124,274.

*To all whom it may concern:*

Be it known that I, CHARLES A. JOHNSON, a citizen of the United States, residing at Unionville, in the county of Hartford and State of Connecticut, have invented a new and Improved Threading-Tool, of which the following is a specification.

My invention relates more especially to that class of threading tools that are supported at the end of a spindle, and an object of my invention, among others, is to provide a device of this class that shall be particularly efficient in its method of operation and in the work produced thereby.

One form of device embodying my invention and in the construction and use of which the objects herein set out, as well as others, may be attained, is illustrated in the accompanying drawings, in which—

Figure 1 is a view in lengthwise vertical section through my improved threading tool.

Fig. 2 is a side view of the same with parts broken away to show construction.

Fig. 3 is an end view with parts broken away in cross section on different planes illustrated by the dotted lines 3—3 of Fig. 1.

Fig. 4 is an end view of the device, looking toward the spindle.

Fig. 5 is a detail view, partially in lengthwise section, illustrating the construction and operation of the clamps for the threading dies.

Fig. 6 is a view in lengthwise section through a threading tool embodying my invention and showing a little different form of the cams on the actuator and on plane denoted by dotted line 6—6 of Fig. 7.

Fig. 7 is a view similar to Fig. 3 but illustrating the form of actuator shown in Fig. 6.

Fig. 8 is an end view of this form of device.

Fig. 9 is a detail view of the actuator shown in Fig. 6.

Figs. 10 and 11 are views illustrating the operation of the threading dies.

In the accompanying drawings the numeral 10 denotes the spindle of a lathe to which my improved threading tool may be attached for the purpose of cutting a thread upon various articles, a bolt 11 being shown herein for the purpose of illustrating the operation. It will be understood that this bolt is suitably held as between the jaws of a chuck, which may be of any ordinary construction and which, therefore, is not shown herein. It will be understood that the article, as the bolt 11, being threaded and the threading tool must have relative rotation as well as relative movement lengthwise of the bolt, and while the chuck holding the article to be threaded, or the spindle to which the threading tool is attached may have either or both of these movements, or may be stationary as to either or both of such movements, it may be understood for the present disclosure that the spindle 10 has both a rotary and longitudinal movement which may be obtained by mechanism well known to those skilled in the art and for which reason such a showing is omitted herein.

The spindle 10 is threaded as at 12 for attachment within a threaded opening 13 in the body 14 of my improved threader, that is secured to the spindle with its head 16 preferably resting against a flange 15 on the spindle. This body 14 has recesses 17, round in shape in cross section and extending from underneath the head 16 to the opposite end of the body to receive die supports 18 to be hereinafter described. An annular groove 19 extends around the body, intersecting the recesses 17, and preferably of a depth a little less than that of the recesses 17. Holes 20 extend from the bottom of this groove into the opening in the interior of the body, these holes being preferably rectangular in shape and other holes 21, preferably round in shape, also extend from the recesses 17 into the opening in the center of the body. An actuator 22 is slidably mounted in the opening through the body, this actuator having a die opening groove 23 to contain die opening members and a die closing groove 24 to contain die closing members, to be hereinafter described. An actuating rod 25 is secured to the actuator, as by means of interengaging screw threads, this rod extending within the spindle 10, and which rod will receive a longitudinal reciprocating movement by any well known mechanism which will be thoroughly understood by those skilled in the art and which, therefore, is omitted from the drawings herein. This rod may have a recess 26 extending inwardly from that end within the actuator and into which an article being threaded may extend, when such article is of a length to do this.

A retaining sleeve 27 is mounted upon the body, the opening through the sleeve being of a size to partially receive a portion of the body against its inner wall. This opening in the sleeve has recesses 28 located opposite the recesses 17 in the body, the recesses 17 and 28, when the parts are in their proper position, forming round holes within which the die supports or holders 18 are located for reciprocating movement about their axes. The die supports or holders 18 are cut-away to form shoulders 29 to receive the thrust of actuating plungers. These plungers may be of different constructions, a preferred form being shown herein in which each plunger consists of two balls 30 each seated against a resilient thrust member 31, which, in the form herein shown, is a split ring. These plungers rest each with one end against a shoulder 29 on one of the die supports and with its opposite end against a sizing cam 32 in the die opening groove 23, there being one of these cams for each of the plungers.

The upper ends of the die supports each have die closing arms 33, in the constructions herein shown formed integral therewith, and each arm has a closing finger 34 projecting through one of the holes 20 and resting in contact with a sizing cam 35, there being one of these sizing cams to each of the fingers and hence to each of the die supports. Each of the arms 33 is split as at 36 and an adjusting screw 37 extends from one side of the split portion into the opposite side so that the slot may be closed or permitted to open under spring action of the metal. An opening cam 38 is located at one side of the groove 23 to act upon the plungers, and a closing cam 39 is located at one side of the groove 24 to engage and operate the fingers 34.

Each of the die supports or holders has a die slot 40 at one end, one wall 41 of each slot being corrugated or threaded to correspond with the threads extending along one side of the threading die 42 secured to said holder. The end of each die is beveled off at the back, as at 43 to form a cutting edge, and each threaded wall 41 has its ribs and grooves so arranged that the corresponding threaded surface of the die will be located at the same angle as that of the lead of the screw to be cut, and as shown clearly in Fig. 1 of the drawings.

A clamp 44 is located in the slot in each holder, this clamp being wedge-shape and having a shank 45 projecting through a hole extending diagonally through the support or holder, the outer end of this shank being threaded to receive a nut 46 by means of which the wedge-shaped clamp is drawn into the slot to securely fasten the threading die therein. Any other means may be employed for securing this wedging action of the clamp. The wedge has a rib 52 fitting a groove in the holder.

The actuator 22 is operatively connected with an adjusting member 47 extending through the sleeve 27 and having its end so engaged with the actuator that the latter will be turned when said adjusting member is turned. This result may be accomplished by an eccentric pin on the end of the adjusting member engaging a slot in the actuator, and in the form herein shown there are a number of these pins and slots, which slots constitute teeth 48 on the actuator. Any suitable means may be employed for rotating the adjusting member, as shown herein, an angular shaped recess 50 in the end of the adjusting member being shaped to receive a wrench.

The cutting ends of the dies 42 are moved toward or from each other for thread cutting purposes by turning the holders 18, and for the purpose of adjustably positioning the dies in to cut a thread on a bolt of any required diameter, the holders are turned by turning the actuator 22 as by means of the adjusting member 47. This turning movement of the actuator will cause the sizing cams 32 to move the opening plungers outwardly and this same turning movement of the actuator will cause the cams 35 to permit the fingers 34 to move inwardly toward the axis of the tool. That is, these two sets of sizing cams are so arranged that when the opening plungers are moved outwardly the die supports or holders may turn because the fingers 34 are permitted to move inwardly. This same movement may be employed to take up wear to a certain extent, and the fingers 34 are each adjusted to rest properly against their cams by use of the adjusting screws 37, as hereinbefore explained.

The machine to which the threading tool is attached being in operation the actuator 22 is reciprocated in an axial direction at the proper times by means of the actuating rod 25 as hereinbefore explained. As this rod is moved in one direction the opening cam 38 engaging the opening plungers will force them outwardly, turning the die supports in a direction to open the dies. This same movement places the groove 24 opposite the ends of the fingers 34 that are caused to move into the groove. As the actuator is moved in the opposite direction by means of the actuating rod the fingers 34 are forced apart, the closing cam 39 turning the die holders in a position to close the dies. This closing movement of the actuator places the groove 23 opposite the opening plungers that are caused to move down the opening cam and into said grooves. In this operation the rod 25 will be moved in the proper direction and this movement will be so timed to operate the actuator to open the dies when they have passed from the end of the bolt 11 along the latter to the point at which it is desired the thread shall terminate, and to close said dies after the bolt and dies have been separated to an extent to carry the bolt clear from said dies. It will be understood that this movement of the rod takes place to the necessary extent independently of the movement of the spindle.

The adjusting member 47 is held in place by a retaining screw 63, the end of which is located in a retaining groove 64 in said member. This retaining screw has slots 65 cut across it at certain intervals so that it will yield to a certain extent lengthwise and thus provide for a resilient contact with the member 47, this construction serving the purpose of a spring interposed between a screw cap and plunger commonly made use of in structures of this class.

It will be understood that the articles 11 may be supplied to the threading tool in any desired manner, and the operation of the spindle both as to its rotating and longitudinal movement, as well as the operation of the rod 25, will preferably be automatic. In threading an article the dies are forced onto such article from the end thereof, and to such an extent as it is desired that the thread shall be cut.

The die as embodied in the form illustrated in Figs. 6, 7, and 8 is particularly adapted for cutting threads peculiar to wood screws or bolts, and for cutting this thread in a single movement of the dies across the piece. In cutting this thread the operation begins at that point nearest the head on the screw at which the thread terminates and the cutting operation is toward the point of the screw. To effect this result the actuator is operated to open the dies 51 as the article to be threaded and the threading tool approach one another, whereas in the form of the device above described a reverse operation takes place.

In the device hereinbefore described there are two formations up which the plungers and fingers ride in the operation of the device, whereas in the device of Figs. 6 to 8 inclusive, these cam surfaces are on opposite sides of a single formation 53 located between the depressions or recesses that receive the plungers and fingers. It will, however, be understood that this single formation may be embodied in the structure shown in Figs. 1 to 4 inclusive, or that the double formation shown in said Figs. 1 to 4 may be embodied in the structure shown in Figs. 6 to 8 inclusive. In the structure shown in Figs. 6 to 8 the opening and closing formations are formed at the end of recesses extending lengthwise of the actuator instead of at the end of recesses extending entirely around the actuator as shown in Figs. 1 to 4 inclusive.

In the device of Figs. 6 to 8 inclusive the actuator 54 is attached to the rod 25 in the same manner as in the other device. This actuator is retained within the body of the threader as by means of a retaining screw 55 that projects through the body into a retaining recess 56 in the actuator. This actuator has a series of forming recesses 57 located at one end of the actuator and another series of forming recesses 58 located at the other end of the actuator, the plungers projecting into the recesses first mentioned and the fingers 34 projecting into the recesses last mentioned. It will be noted that the bottoms of these recesses are of a form to regulate the opening and closing movements of the dies so that after they are closed on to the blank 62 they will run along without opening or closing movement until the body of the screw 61 is cut, and then the dies are caused to rapidly close together to enable the pointing edges 59 of the dies 51 to rapidly cut off the end of the screw and form the usual point thereon. The structure is such and the dies are so formed that I am able to cut a form of thread common to screws that are used in wood in a single passage of the dies across the blank and to form the point of the screw in this same operation. The operation of the device shown in Figs. 6 to 8 will be readily understood from the description hereinbefore given.

It will be noted that the threaded interengaging surfaces of the dies 42 and the walls 41 of the slots 40 cause the dies to be always inserted in the proper position in the slots, and the pressure exerted upon the dies in the cutting operation is such as to set together the threaded grooved surfaces, should they for any reason be slightly disengaged. This engagement of the threaded cutting surface of each die with a corresponding threaded surface of the die slot is an important feature of my invention, as each die is necessarily held solely by the interengaging threaded surfaces. Another important feature resides in that construction of the die holder whereby the cutting tools each press upon one side of the article being threaded, and the arms and fingers 34 each press against the actuator upon substantially the diametrically opposite side of the structure from that engaged by its cutting tool. The dies engaging an article being threaded on all sides thereof, it forms at this time substantially an integral part of the structure, and the thrust upon each holder caused by the cutting action of its tool is resisted through its arm and finger by substantially the same structure and upon the opposite side of the axis thereof from that engaged by the tool, so that the forces are, in a manner balanced. This structure prevents all vibration or chatter of the tool in use.

When the tool is arranged to cut the thread beginning at that end opposite the point the spindle will be turned to the left and consequently the screw thread engaging the head 16 will be a left-hand thread instead of a right-hand thread as in the form of the device shown in Fig. 1. It will be noted that the surface engaged by the fingers 34 at the bottom of the recesses 58 is much shorter than the length of the thread upon the screw 61 that is cut by the operation of this device. The independent movement of the actuating rod 25 enables the thread on the screw 61 to be cut, employing this short surface in the recess 58, the actuator 54 being given a movement through the medium of the rod to an extent to keep the fingers 34 in contact with the surfaces of the bottoms of the recesses 58 for a time sufficient to enable the thread to be cut, during which time the dies are performing the cutting operation on the main part of the screw thread.

In accordance with the provisions of the patent statutes, I have described the principles of operation of my invention, together with the apparatus which I now consider to represent the best embodiment thereof; but I desire to have it understood that the apparatus shown is only illustrative, and that the invention can be carried out by other means within the scope of the appended claims.

I claim:

1. A rotatable body, a die holder mounted in the body to rotate on its longitudinal axis, an actuator movably mounted within the body to impart reciprocating movement to said holder on its axis, connections between the actuator and the die holder for positively moving said holder in both directions of a reciprocating movement, and means extending into the end of the body and connected with said actuator to operate it.

2. A rotatable body, a die holder rotatably mounted in the body, an actuator movably mounted in the body and having cams, to impart reciprocating movement to said holder on its axis, connections from the die holder engaging said cams to positively move the holder in both directions of a reciprocating movement, and means extending into the end of the body and connected with said actuator to operate it.

3. A rotatable body, a die holder rotatably mounted in the body for reciprocating movement on its axis and having a finger rigidly connected therewith, a plunger operatively connected with the holder, and an actuator movably mounted in the body and having cams to engage said plunger and said finger.

4. A rotatable body, a die holder rotatably mounted in the body and having an arm at one end with a finger projecting therefrom, a plunger operatively connected with the holder, and an actuator movably mounted in the body and having recesses to receive said finger and plunger and with cams at the edges of said recesses to move said finger and plunger.

5. A rotatable body, a die holder mounted in the body to rotate on its longitudinal axis therein, an actuator mounted for longitudinal and rotatable movements in the body, connections between the actuator and the die holder to impart both of said movements of the actuator to said holder and means extending into the end of the body and operatively connected with said actuator to operate it.

6. A rotatable body, a die holder rotatably mounted in the body, an actuator mounted for longitudinal and rotatable movements in the axial center of the body, one of which movements is an adjusting movement and the other an actuating movement, connections between the actuator and the holder to impart both of said movements to said holder, and means extending into the end of the body and operatively connected with said actuator to operate it.

7. A rotatable body, a die holder rotatably mounted in the body, an actuator mounted for longitudinal and rotatable movements in the axial center of the body, said actuator having adjusting cams and actuating cams, connections between the actuator and holder and both of said cams to impart both of said movements of the actuator to the holder and means extending into the end of the body and operatively connected with said actuator to operate it.

8. A rotatable body, a die holder rotatably mounted in the body, an actuator mounted for longitudinal and rotatable movements in the axial center of the body, connections between the actuator and holder to impart both of said movements of the actuator to said holder, said connections also including means for positively moving the holder in both directions of a reciprocating movement and means extending into the end of the body and operatively connected with said actuator to operate it.

9. A rotatable body, a die holder mounted in the body, an actuator mounted for longitudinal and rotatable movements in the axial center of the body, one of which movements is an adjusting movement, connections between said actuator and holder to impart adjusting movement of the actuator to the holder and also the longitudinal movement of the actuator to positively move the holder in both directions of a reciprocating movement and means extending into the end of the body and operatively connected with said actuator to operate it.

10. A rotatable body, a die holder rotatably mounted in the body, an actuator mounted for longitudinal and rotatable movements in the axial center of the body, said actuator having cams to operate in both of said movements, a connection between the holder and one of said cams to move the holder for adjusting purposes, and to engage with the other cam on the actuator to move the holder for feed purposes and means extending into the end of the body and operatively connected with said actuator to operate it.

11. A rotatable body, a die holder rotatably mounted in the body, an actuator mounted for longitudinal and rotatable movements in the body, said actuator having recesses with cam faces in the bottom and edges thereof, and connections between said holder and said actuator, said connections extending into said recesses for operation by all of said cams to positively move the actuator in both directions of its reciprocating movement.

12. A rotatable body, a die holder rotatably mounted in the body and having a finger connected therewith, an actuator mounted for longitudinal and rotatable movements in the body and having recesses with cams thereon, one of which recesses receives said finger, and a plunger connecting the actuator with the other of said recesses.

13. A rotatable body, a die holder rotatably mounted in the body, an actuator mounted for longitudinal and rotatable movements in the body and having a recess with a cam at its bottom extending in a peripheral direction, a cam at its edge extending in a longitudinal direction, and a connection between the actuator and holder to operate the latter by both of said cams.

14. A rotatable body, a die holder rotatably mounted in the body, an actuator mounted for rotatable and longitudinal movements in the body, said actuator having recesses each with a peripherally extending cam at its bottom and a longitudinally extending cam at its edge, and a member projecting into both of said recesses and operatively connected with the die holder.

15. A rotatable body, a die holder mounted in the body, an actuator mounted for rotatable movement in the body, and a resilient plunger connecting the actuator and holder and transmitting the movement of the former to the latter.

16. A rotatable body, an actuator movably mounted in the body, a holder movably mounted in the body, and a plunger consisting of a resilient ring with balls on opposite sides of said ring operatively connecting the actuator and holder.

17. A rotatable body, a die holder mounted in the body, an actuator rotatably mounted in the body, a connection between the actuator and holder for operating the latter, and an adjustable member rotatably mounted in the body and having an eccentric projection engaging a recess in the actuator whereby operation of the adjustable member will rotate the actuator.

18. A rotatable body, a die holder mounted in the body, an actuator mounted in the body and operatively connected with the die holder, an adjustable member for said actuator, and a retaining screw for said adjustable member, said retaining screw being split laterally to cause resilient action.

19. A rotatable body, a die holder projecting at the lower end of the body and having a slot with a threaded wall therein, said slot extending across said holder, a die having a flat threaded surface to constitute the cutting end thereof, the threaded wall of said slot corresponding to that of said die, and means for holding the two threaded surfaces in engagement to retain the die in place in the slot.

20. A body part, a holder movably mounted in the body and having a die slot in one end extending across said holder and with a threaded wall, a die having a threaded surface extending lengthwise thereon and constituting the cutting end, the threaded surface of said wall corresponding to that of said die, a clamp to force the threaded surfaces of the die and slot into engagement, and means for operating the die holder.

21. A body part, an actuator movably mounted in the body, a holder movably mounted in the body and having means to support a tool to engage an article to be threaded on one side thereof, a projection from said holder to engage the actuator upon the opposite side only of the axis of the holder from the point engaged by said tool, whereby the forces to move the cutting die into operative position and the force to resist its action are balanced, and means to operate the actuator.

22. A body, a die holder mounted for turning movement in the body, said die holder having a shoulder, an actuator located within the body and having a bearing surface, means for moving the actuator, and a plunger having one end in engagement with said bearing surface and the other end arranged to engage said shoulder whereby the tool holder is operated by force applied to one side only of said holder and through a movement of the actuator.

23. A rotatable body, and die holder projecting at the lower end of the body and having a slot with a threaded wall therein, said slot extending across the holder, a die having a flat threaded surface extending to and constituting the cutting end thereof, the threaded wall of said slot corresponding to that of said die, and the threads on said wall being located at the same angle with respect to the axis of the article to be threaded as the lead of the screw on said article.

24. A rotatable body, an actuator mounted on the body, means for adjusting the actuator about its axis, a die holder mounted in the body and rotatable on its longitudinal axis and having an arm extending therefrom with a finger to engage the actuator, said arm being split, and means for expanding and contracting the split portion to adjust the position of said arm.

25. A rotatable body, a die holder rotatably mounted in the body, an actuator movably mounted within the body to impart reciprocating movement to said holder on its axis, and a plural number of connections between the actuator and die holder for positively moving said holder in both directions of a reciprocating movement.

CHARLES A. JOHNSON.

Copies of this patent may be obtained for five cents each, by addressing the "Commissioner of Patents, Washington, D. C."